United States Patent [19]

McCune et al.

[11] Patent Number: 5,027,675
[45] Date of Patent: Jul. 2, 1991

[54] BICYCLE PEDAL AND SHOE HAVING MATING STEPPED SURFACES

[76] Inventors: William L. McCune, 1739 W. 35th Ave., Denver, Colo. 80211; Eric A. Sampson, 1202 Roslyn St., Denver, Colo. 80220

[21] Appl. No.: 323,726

[22] Filed: Mar. 15, 1989

[51] Int. Cl.⁵ .................. G05G 1/14; A43B 5/00
[52] U.S. Cl. .................. 74/594.6; 74/594.4; 36/131
[58] Field of Search .......... 74/594.4, 594.6; 36/131, 132

[56] References Cited

U.S. PATENT DOCUMENTS

| | | | |
|---|---|---|---|
| 4,542,599 | 9/1985 | Annovi | 36/132 X |
| 4,596,163 | 6/1986 | Bon | 74/594.4 X |
| 4,662,090 | 5/1987 | Solano | 36/131 |
| 4,836,047 | 6/1989 | Alcamo | 74/594.6 |
| 4,876,808 | 10/1989 | Hsieh | 36/131 |

*Primary Examiner*—Vinh T. Luong
*Attorney, Agent, or Firm*—Rothgerber, Appel, Powers & Johnson

[57] ABSTRACT

A bicycle pedal is mounted on a spindle secured to a crank arm. A pedal platform has a stepped upper surface. A cycling shoe is provided with a cleat section extending under the ball area of the cyclist's foot. The cleat section is provided with a stepped surface that is complementary with the stepped surface of the pedal. These complementary stepped surfaces include risers and steps that interlock or matingly engage when the shoe is pressed downwardly onto the pedal. When the risers of the shoe and the pedal matingly engage, they permit rearward and downward thrust of the shoe against the pedal to rotate the crank arm in the customary direction for driving a chain of the bicycle. Apertures provided in the pedal between the risers permit debris from the stepped surface of the shoe to fall through the pedal and not interfere with the mating engagement of the pedal with the shoe. A scraper blade secured to the rear of the pedal allows a cyclist wearing a cycling show to scrape the show clean and to otherwise additionally engage the shoe to the pedal to assist in rotating the crank arm.

2 Claims, 4 Drawing Sheets

BICYCLE PEDAL AND SHOE HAVING MATING STEPPED SURFACES

BACKGROUND OF THE INVENTION

1. Field of the Invention

The present invention relates to bicycle pedals and shoes for cycling and, more particularly, to pedals and shoes each provided with a stepped surface that mates with the other stepped surface to improve the rearward thrust of the shoe on the pedal.

2. Description of the Related Art

At this point in time, pedals for bicycles comprise many different styles and types, depending upon their intended use. These include conventional pedals, which may employ a toe clip and a strap.

A generic pedal consists of a housing which fits over a spindle attached to the crank arm of the bicycle. Typically, some type of bearings are contained inside this housing, allowing the pedal to spin freely around the spindle. A cage providing a platform for the foot is typically attached to or molded onto the pedal housing.

In order to enable the cyclist to apply force to the pedal in both pushing and pulling motions, manufacturers added an attachment to the front of the pedal which contains the forward portion of the cyclist's shoe, commonly referred to as a "toe clip." By running a strap through both the pedal and the toe clip, a cyclist can tighten the strap, holding the foot securely to the pedal during the upward pulling motion.

In an attempt to harness even more pulling power, a cleat with a slotted opening was affixed to the cyclist's shoe, with the cleat fitting over the rear cage portion of the pedal platform.

Although very commonly utilized, these new embodiments, while providing more power, created an entirely new set of problems—particularly when adapted to the new generation of all-terrain bikes (ATBs), which are designed for use on rugged trails or other off-road areas.

When the pedal s described above are employed, numerous difficulties arise. When the pedal is at rest, it is upside down due to the force of gravity. The cyclist must therefore flip the pedal up before inserting his foot into the toe clip. Also, in order to get any pulling benefit from the pedals, the strap must be pulled so tight that it cuts off foot circulation, as well as making exiting the pedal extremely difficult without first loosening the strap. If a cleat is used, the difficulty in removal of the foot is compounded because the strap must be enlarged enough to allow the cleat to be picked up and off the pedal cage before the foot can exit the pedal.

All of the above problems are formidable enough on flat, dry roads, much less when used with ATBs on steep, muddy trails which require expert skill and precision to maintain the balance necessary to re-enter a pedal with toe clips and/or straps.

Only one pedal is known to applicant that addresses these problems. Such pedal features a circular slot in the top housing of the pedal, to which a standard cage or platform is attached. A button-like protrusion is affixed to the cyclist's shoe, extends from the shoe and slides into the slot. When the protrusion is engaged with the slot, pulling ability is enhanced, eliminating the need for toe clips and straps. However, it may be difficult for the protrusion to enter and exit the slot in that the protrusion can become encased in mud. Further, a specific motion must be carefully performed to engage as well as disengage the protrusion with and from the slot of the pedal. In many instances, only the most expert riders can perform these tasks comfortably.

SUMMARY OF THE INVENTION

Applicant's experience with the above-described pedals and shoes for cycling indicates that the prior art pedals and shoes that include cooperating structures raise problems in bringing those structures into engaged relationship. This is especially so when the bicycle is an all-terrain bicycle designed to be used on rough or mountainous terrain. Additionally, those structures of prior art shoes often interfere with attempts by the cyclist to walk while wearing the shoes. Again, when the bicycle is an all-terrain bicycle, this is a special disadvantage because the rider often dismounts such bicycle and walks or pushes the bicycle over difficult terrain. Thus, such structures that interfere with walking are to be avoided.

As to the prior art bicycle pedals and shoes for cycling that rely on straps or clips for holding the shoe in contact with the pedal, while such straps or clips may be necessary for racing, for example, such straps or clips present problems when the bicycle is an all-terrain bicycle. In that case, because of the uneven and difficult terrain, the shoe must be free to be quickly removed from the pedal. Similarly, the shoe must be designed to be quickly placed on the pedal.

Applicant's efforts to avoid the limitations of the prior art bicycle pedals and shoes for cycling indicate that mating surfaces can be provided on such pedals and shoes for increasing the rearward forces exerted on the pedals without requiring straps or other clips or the above-described protrusions to hold the shoes in contact with the pedals. These mating surfaces include at least one ridge or riser provided on a top surface of the pedal. The riser is in the form of a generally vertically-extending surface that is adjacent a horizontal depression or step. The riser and the step cooperate to form a stepped surface. A similar stepped surface is provided on a section of the shoe that is under the ball of the foot of the wearer. Alternatively, a series of risers or ridges and alternating depressions or steps may form the stepped surfaces of the shoe and the pedal. The risers and the steps of the shoe are the reverse of and are thus complementary with and mate with the risers and the steps of the pedals. With the embodiment set forth in the present invention, the cyclist need only place his or her foot on the top surface of the pedal to obtain improved pulling power. The mating like engagement of the shoe cleat with the pedal surface provides resistance through a common pedaling motion, consisting of a downward push followed by a movement similar to that used in scraping mud off one's shoe. The risers of the shoe cleat are thrust by the wearer against the risers of the pedal as the wearer rotates the pedal downwardly and rearwardly. The mating risers and steps are effective to cause the pedal to rotate the crank arm through an additional 90° of the motion of the crank arm as compared to a standard pedal and shoe. Further, to minimize the effects of debris and other materials that might accumulate on the mating risers and steps of the shoes and the pedals, apertures are provided in the steps of the mating, stepped surfaces. Further, a wide transverse aperture is provided in the pedal rearward of the mating surface of the pedal for permitting debris to fall through the pedal when the stepped surface of the shoe is on the mating stepped surface of the pedal or is scraped against a bar that is positioned at the rear of the pedal. When a rapid exit is required, the cyclist simply lifts his or her foot off the pedal without using any predetermined pattern of motion.

The present invention may also be used with toe clips and straps, at the cyclist's option. When a brake mechanism is used, the pedal will accept the cyclist's foot without having to flip the pedal, allowing for very rapid engagement. Alternatively, the pedal can be made without the brake and be provided with the stepped surfaces on both faces of the pedal to provide fast entry without worry as to whether the pedal is "right side up."

An object of the present invention is to enable a shoe and a cooperating pedal to be easily separated yet provide interlocking engagement of the shoe and the pedal for turning a crank arm of a bicycle.

Another object of the present invention is to provide surfaces of a pedal and a shoe with mating sections that not only transfer rearward force to the pedal from the shoe, but permit easy walking by the cyclist on the shoe.

A further object of the present invention resides in the provision on a cyclist's shoe of a stepped surface that engages a correspondingly stepped surface on a bicycle pedal for transmitting force to the pedal for turning a crank arm of the bicycle.

Yet another object of the present invention is to provide apertures in a pedal adjacent mating surfaces of a shoe and the pedal, where those mating surfaces are stepped to transmit force to the pedal for turning a crank arm of the bicycle and in which a scraper blade is mounted adjacent one of the apertures for cleaning excess debris off the shoe.

Still another object of the present invention is to provide mating surfaces on a cyclist's shoe and on a bicycle pedal for transmitting force to the pedal to rotate a crank arm of the bicycle without interfering with the structure of a brake provided on the pedal.

With these and other objects in mind, the present invention is provided on a cyclist's shoe and a pedal of a bicycle that is driven by the shoe. The pedal is mounted for rotation relative to a spindle secured to a crank arm that drives a chain of the bicycle. The pedal has a central flat surface and a forwardly extending stepped surface having at least one step and a riser adjacent the step. The shoe is provided with a cleat section extending under the ball of the cyclist's feet. The cleat section is provided with a stepped surface that is complementary in shape to that of the stepped surface on the pedal. These complementary stepped surfaces matingly engage each other when the shoe is pressed downwardly onto the pedal, such that the vertical risers of the shoe and the pedal interlook and permit rearward and downward thrust of the shoe against the pedal to rotate the crank arm in the customary direction for driving the chain. Alternatively, a series of risers or ridges and alternating depressions or steps may form the stepped surfaces of the shoe and the pedal. Apertures are provided in the steps of the pedal between the vertical risers of the pedal so that debris that may accumulate on the stepped surface of the shoe and that is dislodged from the shoe can fall through the pedal and not interfere with the mating engagement of the pedal with the shoe. At the rear of the pedal, a vertically-extending plate is mounted in either of two positions. One position locates a serrated edge of the plate adjacent and above an upper rear surface of the pedal. In a reverse position of the plate, a generally flat edge is positioned adjacent and above an upper rear surface of the pedal. The serrated surface and the flat surface allow the cyclist to scrape the shoe clean and to additionally engage the pedal to assist in rotating the crank arm.

BRIEF DESCRIPTION OF THE DRAWINGS

Other objects, features and advantages of the present invention will be apparent from an examination of the following detailed descriptions, Which include the attached drawings in which.

DESCRIPTION OF THE PREFERRED EMBODIMENTS

Cooperating Shoe 10 and Pedal 11

Figure 7:
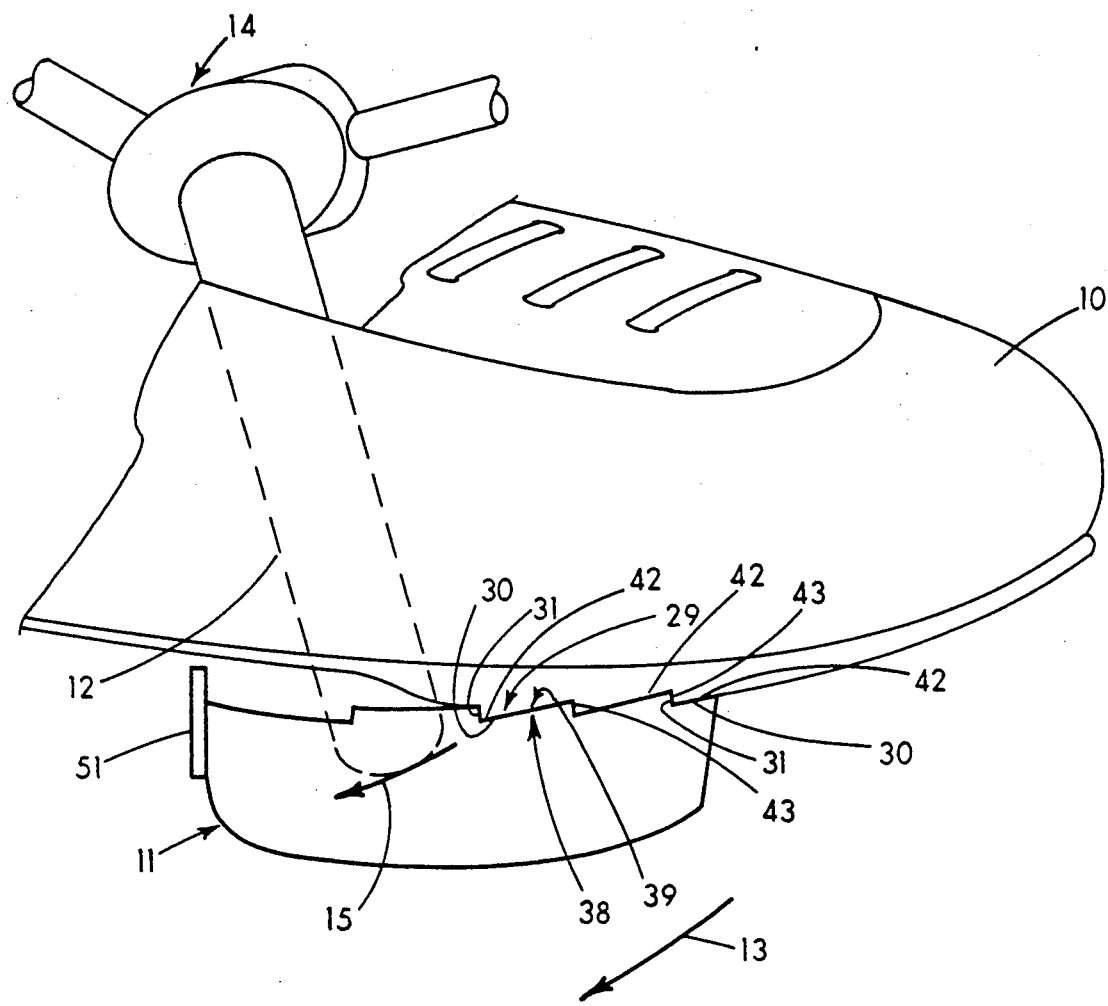
FIG. 7 is a side elevational view showing the shoe having the cleat thereof engaged with the mating forward stepped surface of the pedal and providing rearward force on the pedal to rotate the crank arm of the bicycle.

Referring first to FIG. 7, the present invention is useful for mating a cycling shoe 10 with a bicycle pedal 11 so that a crank arm 12 to which the pedal 11 is secured can be efficiently rotated in the direction of the arrow 13 yet the shoe 10 can be quickly and easily disengaged from the pedal 11. This ease of disengagement is especially important when a bicycle 14 to which the crank arm 12 and the pedal 11 are attached is designed for use as an all-terrain bicycle suitable for riding over rough, hilly or other difficult terrain. This rapid and easy disengagement of the shoe 10 from the pedal 11 can be accomplished without detracting from the application of a generally rearward and downward force (illustrated by the arrow 15 in FIG. 7) on the pedal 11.

Shoes 10 and 10A with Stepped Surfaces 29

Figure 1A:
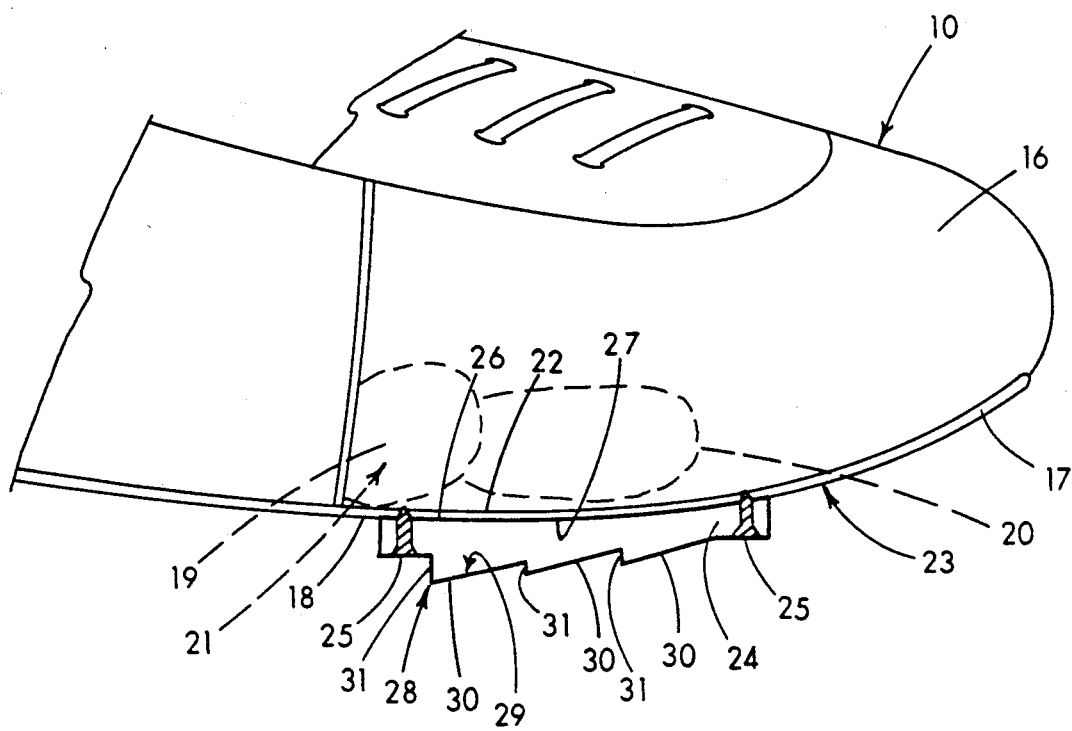
FIG. 1A is a perspective view of a shoe provided with a cleat secured to a sole of the shoe according to the principles of the present invention, where the cleat has a stepped surface.

Referring now to FIG. 1A, the shoe 10 is shown provided with an upper 16 and a sole 17 secured to the upper 16 in a standard manner. In the embodiment of the shoe 10 shown in FIG. 1A, the sole 17 extends under the upper 16 from a heel (not shown) to a central or ball section 18 that is designed to be under a ball 19 of the foot 20 of the cyclist 21 (see dashed lines illustrating the ball 19 of the foot 20 of the cyclist 21). The ball section 18 serves as a support and is also referred to as a cleat support section 22. The sole 17 extends forwardly past the cleat support section 22 to a front section 23 of the shoe 10. The cleat support section 22 is under the ball 19 of the foot 20. A cleat 24 is secured to the cleat support section 22 by screws 25 or other fasteners. The cleat 24 is thin in the vertical direction as shown in FIG. 1A and extends across most of the width of the shoe 10. The cleat 24 is provided with a curved upper surface 26 that matches the contour of a lower curved surface 27 of the sole 17. A bottom 28 of the cleat 24 is provided with a stepped surface 29 that is formed by a series of generally horizontally-extending surfaces or steps 30. The steps 30 are interrupted by generally vertically-extending surfaces referred to as ridges or risers 31. The bottom 28 of the cleat 24 is thus provided with a series of the risers 31 which form ridges and the steps 30 which form depressions to define and form the stepped surface 29.

In an embodiment of the cleat 24 of the present invention, the steps 30 are about one-half to three-quarters of an inch in the front to back direction of the shoe 10 and extend about one to four inches across the width of the cleat 24. The risers 31 in such embodiment of the present invention have a height of about one-eighth of an inch to about one-half inch from one step 30 to an adjacent step 30 and also extend about one to four inches across the width of the cleat. The cleat 24 is preferably molded from polyurethane which is a pliable material selected for comfort when the cyclist 21 is walking, although the cleat 24 can also be manufactured from any other similar material into its desired shape.

Figure 1B:
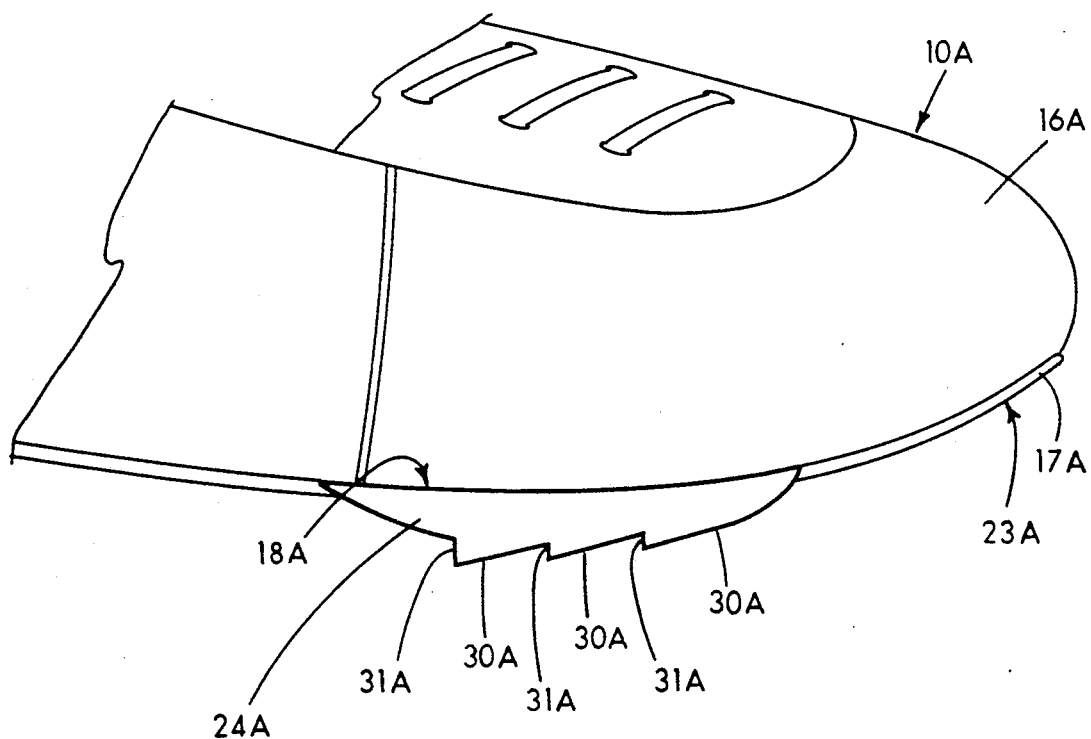
FIG. 1B is a perspective view of another embodiment of the shoe of the present invention, where the sole of the shoe is provided with an integrally molded stepped surface.
Figure 2:
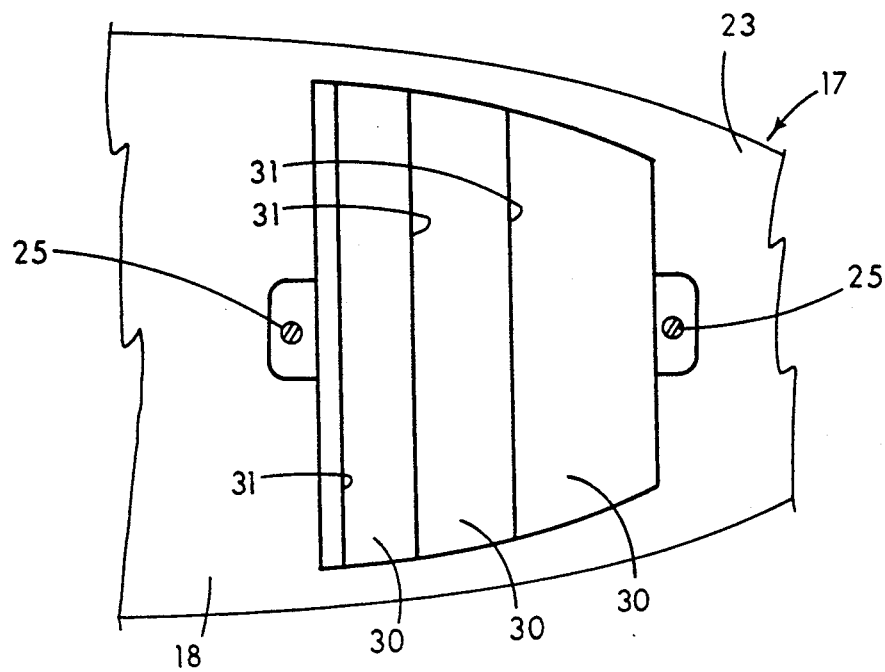
FIG. 2 is a view looking upwardly at the bottom of the shoe shown in FIG. 1A, illustrating the stepped surface of the shoe cleat.

Directing attention to FIG. 1B, a second embodiment of the shoe 10 is shown and is referred to as the shoe 10A. An upper 16A of the shoe 10A is the same as the upper 16 of the shoe 10. In this embodiment, a sole 17A is formed integrally with a cleat section 24A. In particular, the sole 17A has the same heel (not shown) and ball section 18A as the sole 17. The cleat section 24A is formed integrally with the sole 17A under the ball section 18A. The cleat section 24A is under the ball section 18A and behind a front section 23A of the sole 17A in the same position as the cleat 24. The cleat section 24A is formed in the same manner as the cleat 24 is formed, as by molding a plastic material such as polyurethane. The cleat section 24A is thus provided with a series of generally horizontally-extending surfaces that form depressions or steps 30A and that are interposed between generally vertically-extending surfaces that form ridges or risers 31A. It may be understood that the primary difference between the sole 17 and the sole 17A is that the cleat section 24A of the sole 17A is molded with and formed integrally as a part of the sole 17A. Thus, the steps 30A and the risers 31A cooperate to form a stepped surface 29A of the shoe 10A.

Referring to both FIGS. 1A and 1B, it may be understood that because of the relatively short vertical extensions of the vertically-extending risers 31 and 31A from the respective generally horizontal, adjacent steps 30 and 30A of the stepped surface 29 and 29A of the respective soles 17 and 17A, and because of the pliant material from which the cleats 24 and the cleat sections 24A are molded, the shoe 10 is easy and relatively comfortable to walk on. In other words, neither the cleats 24 nor the cleat sections 24A interfere with the normal walking of the cyclist 21 when, for example, it is necessary to push the all-terrain bicycle 14 over the rough terrain.

Pedal 11 With Stepped Surface 38

Figure 8:
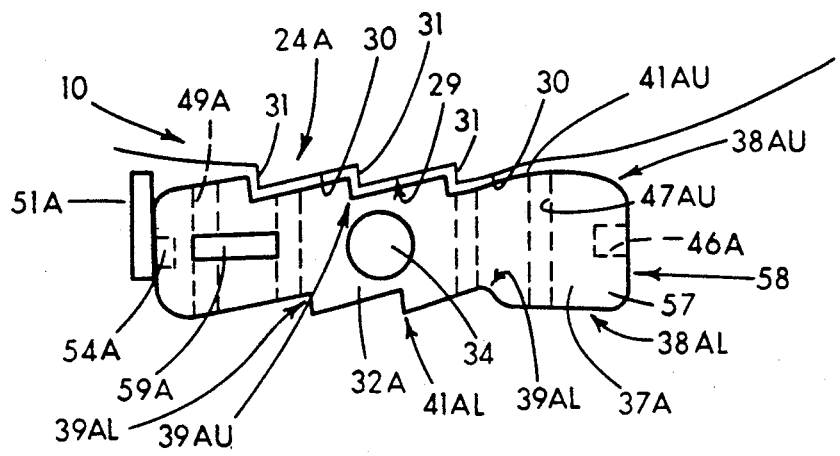
FIG. 8 is a side elevational view of a second embodiment of the pedal of the present invention showing the complementary stepped surfaces provided on both sides of the pedal.

Turning to FIGS. 2 through 7, a first embodiment of the pedal 11 is shown including a central, generally tubular spindle housing 32 having a bore 33 therein that receives an axle or spindle 34 that is secured to the crank arm 12. In a standard manner, bearings (not shown) are contained inside the spindle housing 32, allowing the pedal 11 to spin freely around the spindle 34. As desired, the spindle housing 32 may be provided with a pedal brake 35 as disclosed in pending U.S.A. patent application, Ser. No. 07/054,577 filed May 27, 1987. Such a pedal brake 35 prevents the pedal 11 from spinning relative to the spindle 34 and thus facilitates the placement of the shoe 10 on the pedal 11. However, a second embodiment 11A of the pedal of the present invention is shown in FIG. 8 and may be used without such a pedal brake 35.

The spindle housing 32 is formed integrally with opposite sides 37 (FIGS. 3 and 5) that extend in a forward and backward direction. Each of the sides 37 is formed integrally with a generally flat platform 38 (FIGS. 3 and 4) of the pedal 11. The platform 38 of the pedal 11 includes a forward, cleat-engaging portion 39 and a rear portion 40. The forward portion 39 is provided with an upper stepped surface 41 that includes one or more generally horizontally-extending surfaces or steps 42 that form depressions. One step 42 is adjacent a generally vertically-extending surface or riser that forms a ridge 43. Where many steps 42 are provided, the steps 42 are interrupted by a plurality of the generally vertically-extending surfaces or risers that form the ridges 43. The alternating steps 42 and risers 43 provide an overall stepped contour to the surface 41, which is the reverse of and complementary with the stepped surface 29 of the cleat 24 of the shoe shown in FIG. 1A and with the stepped surface 29A of the cleat section 24A of the sole 17A shown in FIG. 1B.

Mating Engagement of Stepped Surfaces 29 and 41

The complementary surfaces 29 and 41 of the respective cleat 24 (or the cleat section 24A) and that of the cleat-engaging portion 39 of the pedal 11 mate and are said to matingly engage as shown in FIG. 7. As shown there, the generally vertical risers or ridges 31 and 43, and the generally horizontal steps or depressions 30 and 42, respectively, of the respective cleat 24 (or cleat section 24A) and the cleat-engaging portion 39 match to permit such mating engagement. When so engaged, and as shown in FIG. 7, when the shoe 10 is forced rearwardly and downwardly to rotate the crank arm 12, the generally vertical risers 31 and 43 on the respective shoe 10 and pedal 11 cooperate by interlocking with each other to apply the rearward and downward force (see the arrow 15 in FIG. 7) to the pedal 11 to move the pedal 11 rearwardly and downwardly to rotate the crank arm 12 in the direction of the arrow 13. To effect such mating engagement, the cyclist 21 need only move his or her foot 20 so as to place the sole 17 of the shoe 10 on the platform 38 with the stepped surface 29 of the cleat 24 (or the cleat section 24A) engaging the stepped surface 41 of the platform 38. The mating engagement of the stepped surfaces 29 and 41 provides resistance to the common pedaling motion which consists of a downward push followed by a rearward and downward movement (see arrow 15 in FIG. 7) similar to that used in scraping mud off one's shoe. Since such mating engagement is provided without fastening or otherwise securing the shoe 10 to the pedal 11, if the cyclist 21 encounters very rough terrain, the cyclist 21 can easily and quickly remove the shoe 10 from the pedal 11 and place the shoe 10 on the ground for support.

Figure 3:
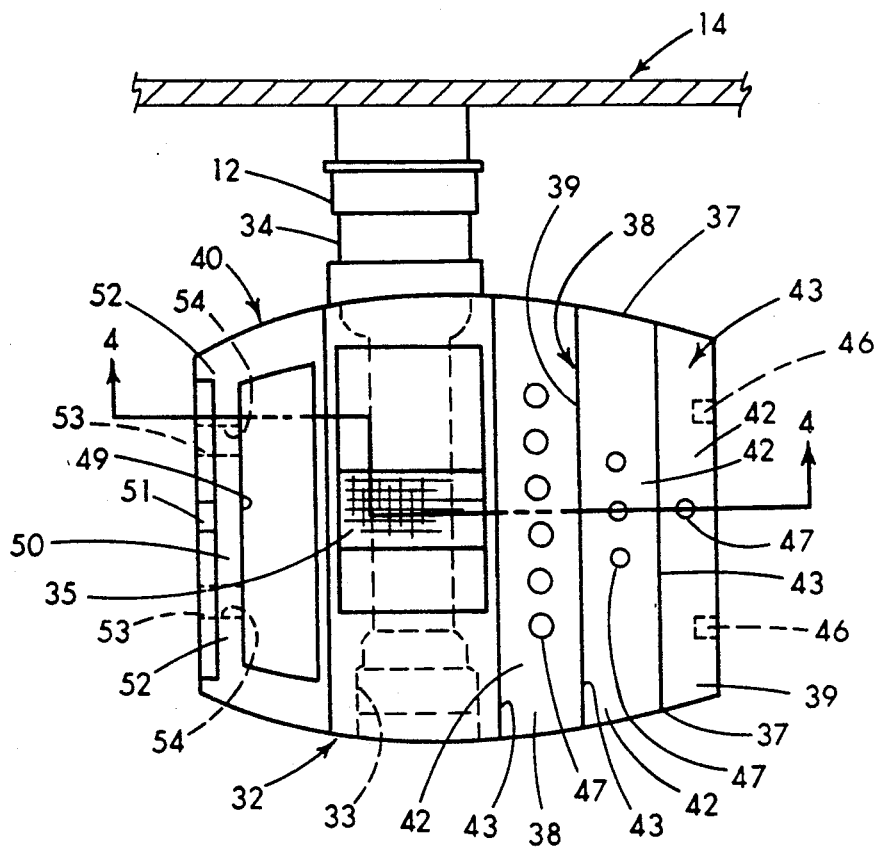
FIG. 3 is a plan view of the pedal of the present invention illustrating a forward stepped surface of the pedal and a rearward section of the pedal having an aperture for receiving debris from the shoe, where the debris is loosened by a plate secured to the rear of the pedal.
Figure 4:
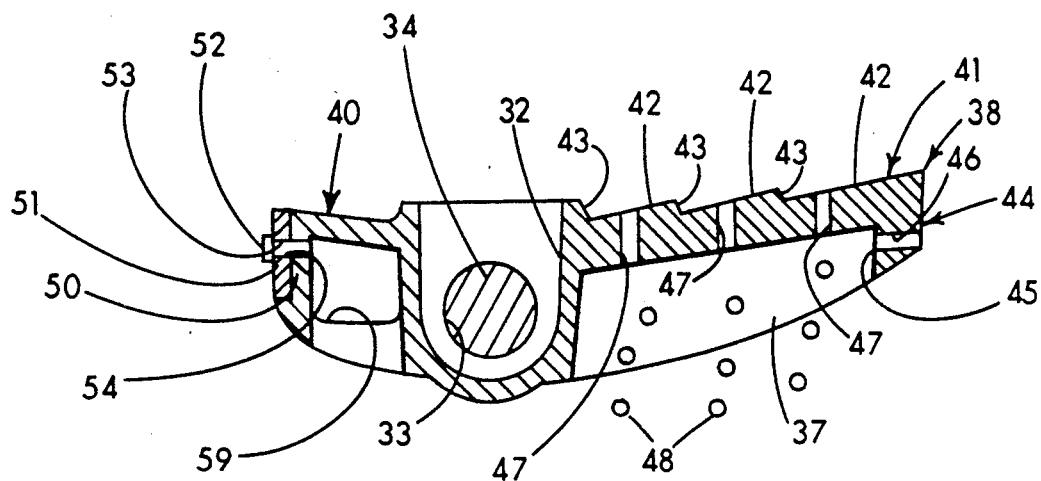
FIG. 4 is a vertical cross-sectional view taken along the line 4—4 in FIG. 3 showing the shape of the forward stepped surface of the pedal that cooperates with the stepped surface on the shoe cleat, with a pedal brake omitted for clarity.
Figure 5:
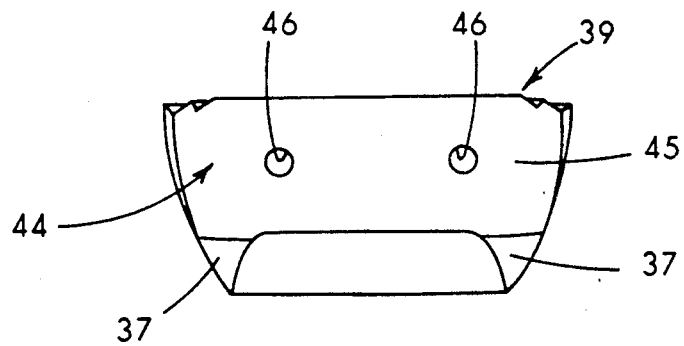
FIG. 5 is a front elevational view of the pedal shown in FIG. 3 illustrating the shape of the pedal beneath the forward stepped surface.
Figure 6:
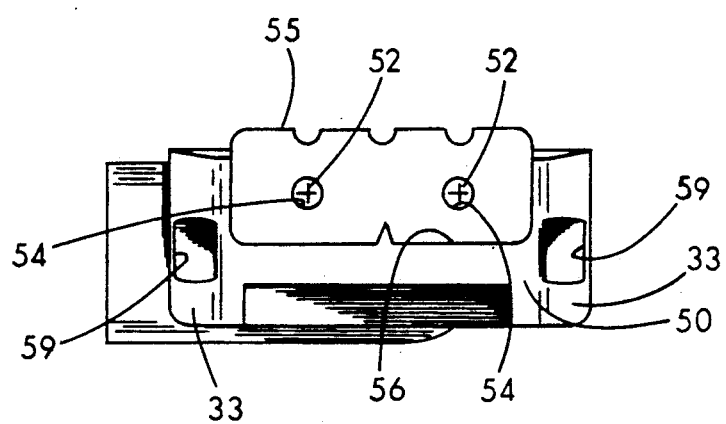
FIG. 6 is a rear elevational view of the pedal shown in FIG. 3 illustrating the blade for removing debris from the shoe.

Referring to FIGS. 3 through 5, a front end 44 of the pedal 11 is shown provided with a vertical wall 45 that is partially cut away (as shown in FIG. 5) and extends between the opposite sides 37 and underneath a forward end 43 (FIG. 3) of the cleat-engaging portion 39. The wall 45 is provided with apertures 46 for use in securing a standard toe clip (not shown) to the pedal 11 in a standard manner as may be desired by the cyclist 21.

Alternatively, where it may be desirable to reduce the size of the pedal 11 to a minimum for reduced weight and other reasons, the mating surfaces 29 and 41 of the pedal 11 and the shoe 10 may be formed from one riser 31 and one step 30 on the cleat 24 and one riser 43 and one step 42 on the pedal 11. The above-described mating engagement is provided in this manner.

Apertures 47 and 49 for Clearing Debris 48

Referring now to FIGS. 3 and 4, the cleat-engaging portion 39 of the pedal 11 is provided with a series of apertures 47 that extend through the stepped surface 41 at spaced locations along each of the horizontally-extending steps 42. These apertures 47 are large enough, such as one-fourth to one-half inch in diameter, so as to allow debris 48 (FIG. 4) from the cleat 24 or the cleat section 24A to fall through the pedal 11 and thus permit the respective risers 31 and 43 and the steps 30 and 42 of the cleat 24 (or the cleat section 24A) and the cleat-engaging portion 39 of the platform 38 to mate as described above.

Scraper Blade 51

Directing attention to FIG. 3, toward the rear of the spindle housing 32, the platform 38 of the pedal 11 is provided with a transverse aperture 49. The transverse aperture 49 is adjacent a rear vertical wall 50 of the pedal 11. A scraper blade 51 is secured to the rear wall 50 of the pedal 11 by removable threaded fasteners 52 that extend through apertures 53, into tapped holes 54 in the rear wall 50. The threaded fasteners 52 can be removed from the holes 54 provided in the rear wall 50 of the pedal 11 and from the spaced apertures 53 provided in the blade 51. The blade 51 can be inverted and resecured to the rear wall 50. In this manner, the blade 51 can be positioned with either a serrated upper edge 55 positioned upwardly, or a flat upper edge 56 positioned upwardly. Both of these upper edges 55 and 56 provide vertical support for the shoe 10 rearwardly of the ball section 18 of the shoe 10. Additionally, because the upper serrated edge 55 and the flat upper edge 56 extend above the platform 38 of the pedal 11, the cyclist 21 can scrape the bottom 28 of the cleat 24 (or the cleat section 24A) against the upper edges 55 or 56 and remove the debris 48 from the sole 17, including the cleat 24 (or the cleat section 24A) of the shoe 10. The removed debris 48 easily falls through the transverse aperture 49 to promote the mating engagement of the stepped surfaces 29 and 41.

Second Embodiment—Pedal 11A

Referring to FIG. 8, the second embodiment of the pedal of the present invention is shown as the pedal 11A. The pedal 11A is especially adapted for use on the spindle 34 in the manner described above, but without the pedal brake 35. In particular, the spindle housing 32A is formed integrally with two platforms 38A on the pedal 11A, one (designated 38AU) is as described above and one (designated 38AL) on a bottom 57 of the pedal 11A. The spindle housing 32A and the platforms 38AU and 38 AL form a body 58 of the pedal 11A. The bottom platform 38AU is provided with a cleat engaging portion 39AU and a stepped surface 41AU that are the same as the respective portion 39 and surface 41.

The bottom platform 38AL is provided with a cleat engaging portion 39AL and a stepped surface 41AL similar to the corresponding elements of the upper platform 38AU. The stepped surface 41AL matingly engages the cleat 24 (or the cleat section 24A) when the platform 38AL is rotated 180° into the position of the platform 38AU shown in FIG. 8. Apertures 47AU and 47AL are provided in the respective platforms 38AU and 38AL to permit removal of the debris 48. Transverse apertures 49A may also be provided and extend through the body 58 of the pedal 11A. Sides 37A of the body 58 are cut away to provide openings 59A for allowing the optional use of toe straps (not shown). Also, apertures 46A may be provided in the body 58 to accept toe clips (not shown) at the option of the rider. An additional aperture 54A can also be provided to accept a scraper blade 51A in the manner described above.

While the preferred embodiments have been described in order to illustrate the fundamental relationships of the present invention, it should be understood that numerous variations and modifications may be made to these embodiments without departing from the teachings and concepts of the present invention. Accordingly, it should be clearly understood that the form of the present invention described above and shown in the accompanying drawings is illustrative only and is not intended to limit the scope of the invention to less than that described in the following claims.

What is claimed is:

1. A bicycle pedal and cycling shoe set for cooperative use to propel a bicycle, said pedal and shoe set comprising:

a cleat provided on said shoe, said cleat having a first stepped surface including a plurality of first risers designed to apply rearwardly extending forces to said pedal, said stepped surface having flat steps interposed between said plurality of first risers;

said pedal being provided with a spindle housing having a given width;

a pedal body extending forwardly and rearwardly of said spindle housing;

a platform formed by said pedal body , said platform having an upper surface provided with a series of depressions extending transversely across said pedal, said upper surface having a ridge between adjacent pairs of said depressions to form generally vertically-extending, rearward-force receiving surfaces, said force receiving surfaces being spaced in the forward to rearward direction of said pedal by distances equal to the forward to rearward spacing of said first risers provided on said cleat of said shoe so that upon placing of said cleat of said shoe on said platform of said pedal said first stepped surface and said upper surface matingly engage with said force receiving surfaces and said first risers interlocked for transmitting said rearwardly extending forces from said first stepped surface to said ridges to move said pedal;

a rear section of said platform extending rearward of said spindle housing, said rear section being provided with a central transverse aperture;

a wall extending across said body of said pedal rearwardly of said rear section, said wall being provided with spaced apertures;

a scraper blade having a first transverse surface provided with a single v-shaped notch, said blade having a second transverse serrated surface provided with a plurality of notches, said blade having holes aligned with said apertures; and a plurality of fasteners extending through said aligned apertures and holes for securing said scraper blade to said wall with a selected one of said first or second transverse surfaces positioned upwardly to engage said cleat of said sole to remove debris therefrom.

2. A bicycle pedal and cycling shoe set according to claim 1, further comprising:

said platform and said rear section each having openings extending therethrough for receiving said removed debris to facilitate said mating engagement and said interlocking of said cleat and said pedal.

* * * * *